Dec. 8, 1959     R. B. TREER     2,915,922
INDEXIBLE TOOL HOLDER
Filed Sept. 7, 1955     6 Sheets-Sheet 1
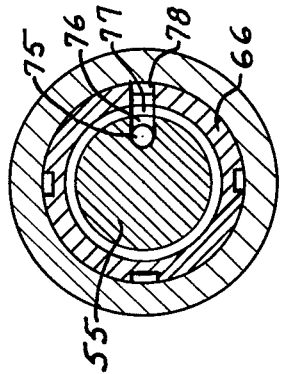
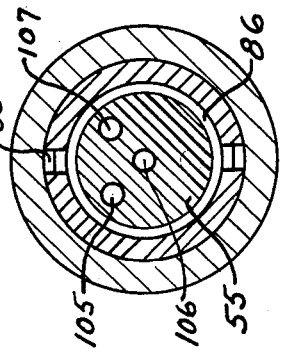
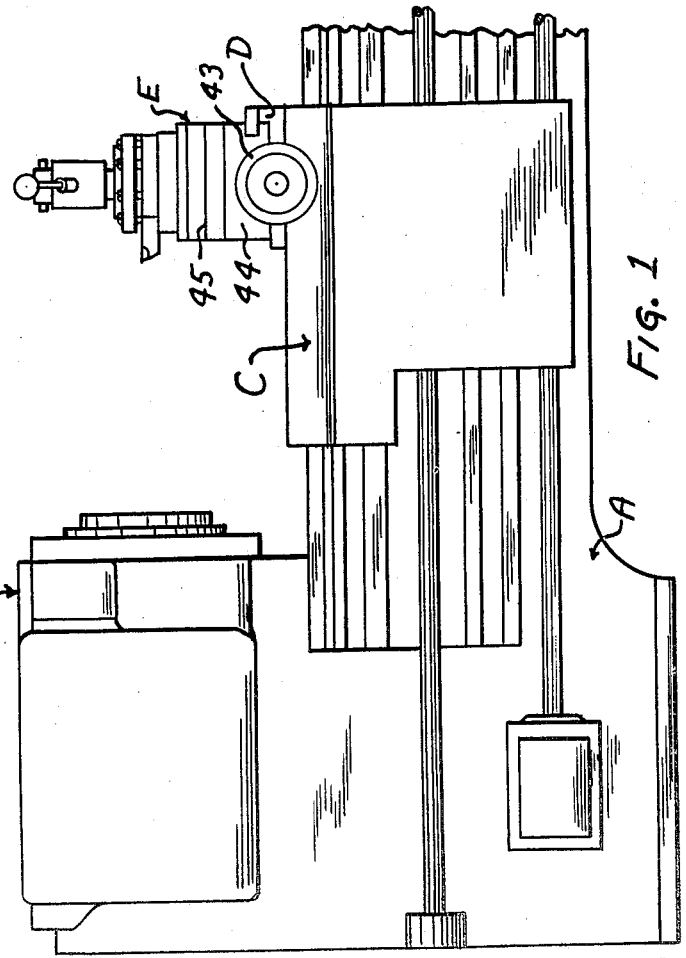
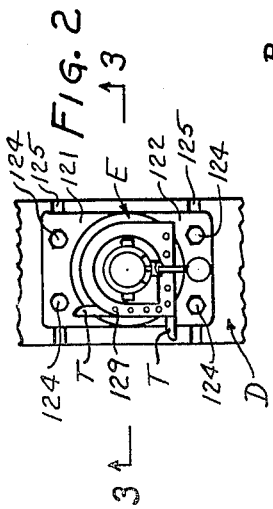
INVENTOR.
ROSS B. TREER
BY
Hudson, Boughton, Williams,
David and Hoffmann
ATTORNEYS INVENTOR.
ROSS B. TREER
BY Hudson, Boughton, Williams,
David and Hoffmann
ATTORNEYS Dec. 8, 1959      R. B. TREER      2,915,922
INDEXIBLE TOOL HOLDER
Filed Sept. 7, 1955      6 Sheets-Sheet 3

INVENTOR.
Ross B. Treer
BY Hudson, Boughton, Williams,
David and Hoffmann
ATTORNEYS

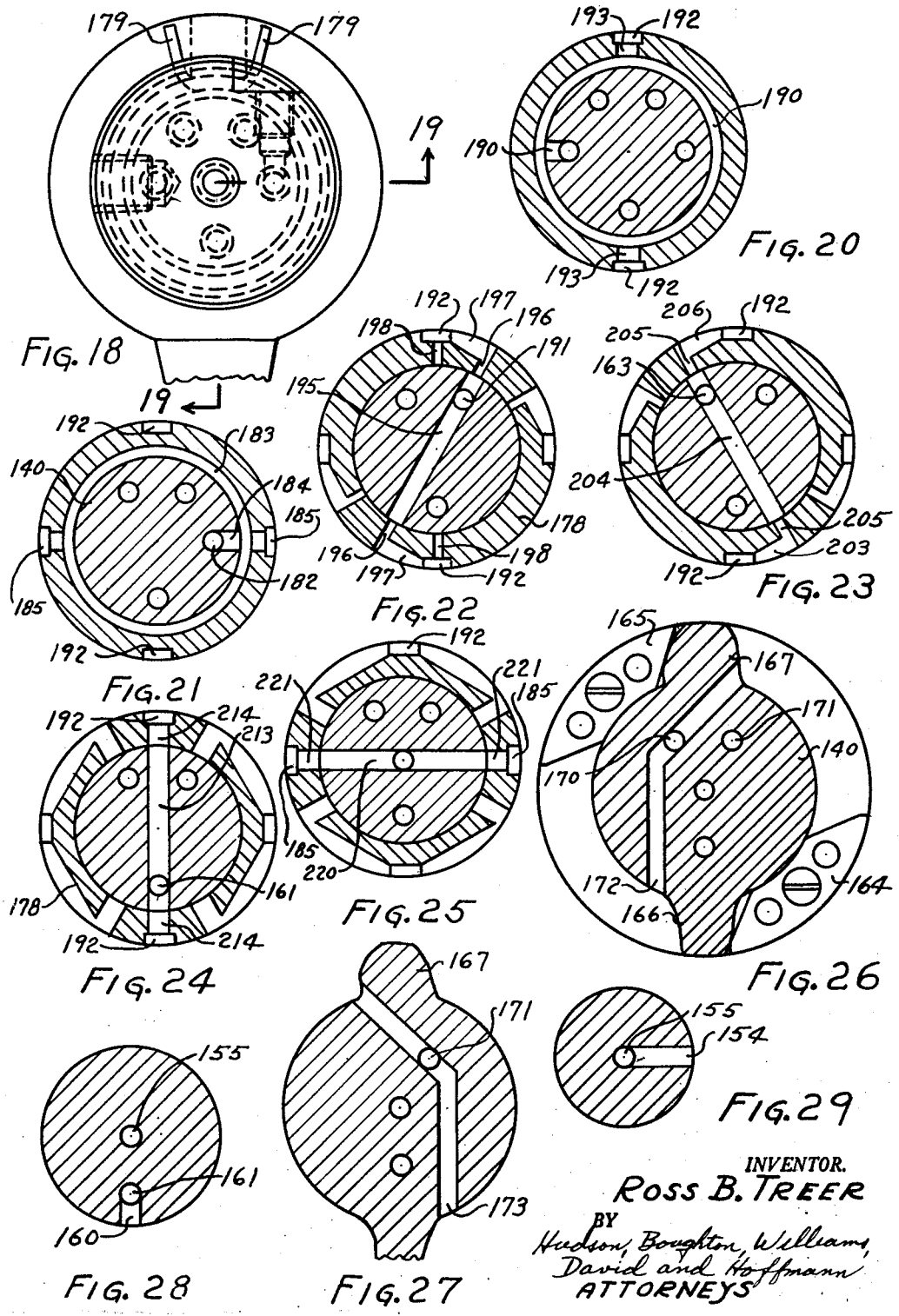

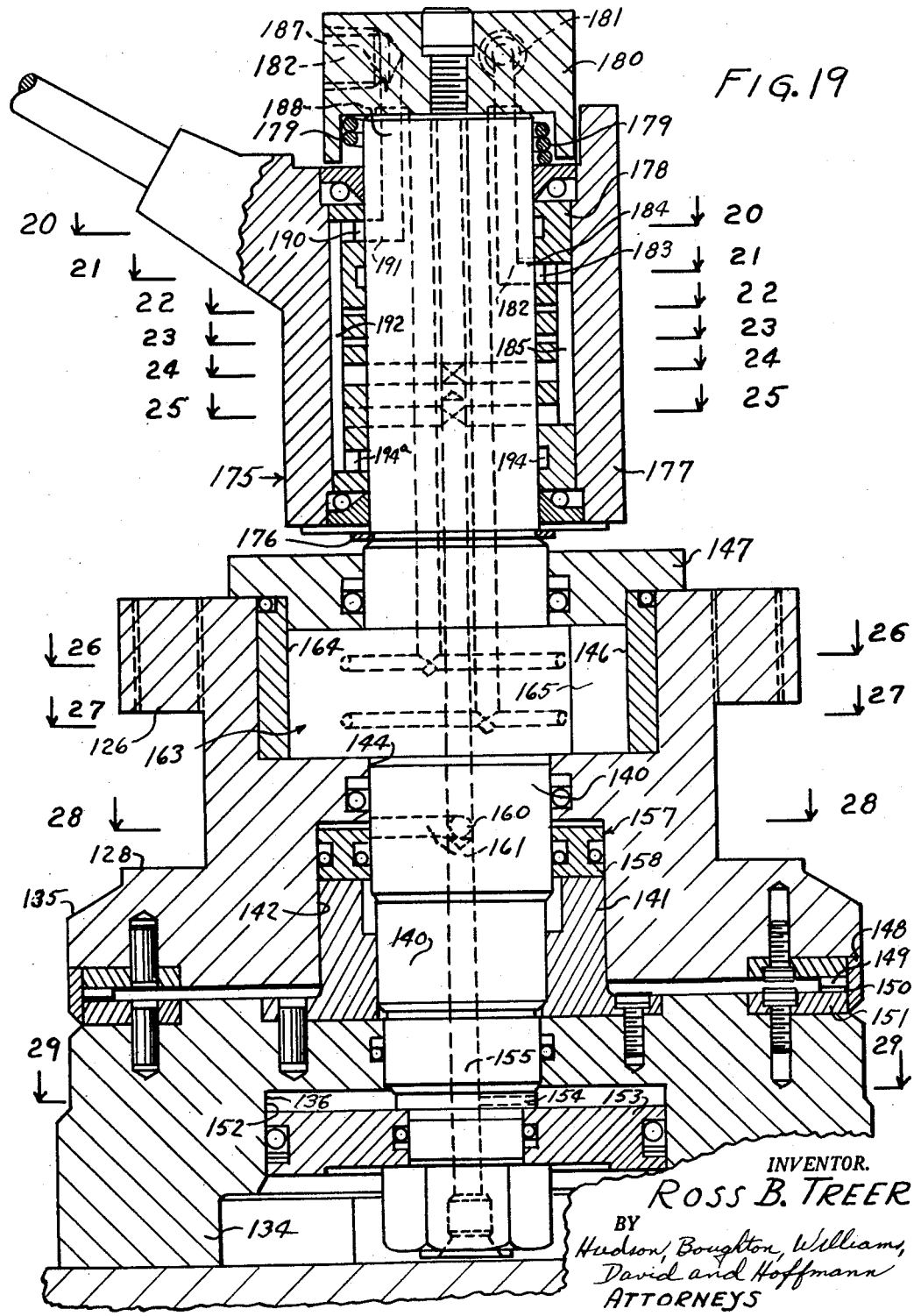

United States Patent Office 2,915,922
Patented Dec. 8, 1959

2,915,922

INDEXIBLE TOOL HOLDER

Ross B. Treer, Lakewood, Ohio, assignor to The Warner & Swasey Company, Cleveland, Ohio, a corporation of Ohio Application September 7, 1955, Serial No. 532,936

9 Claims. (Cl. 74—822)

The present invention relates to machine tools and, more particularly, to a hydraulically indexible holder, especially an indexible tool holder which is readily attachable to, and detachable from, an element of a machine tool, such as the cross slide of a lathe. The present application is a continuation-in-part of my copending application Serial No. 445,036.

It is an important object of the present invention to provide for a machine tool a new and improved hydraulically indexible tool holder which is readily attachable to, and detachable from, an element of a machine tool, such as a cross slide of a lathe and wherein the member which is indexed is raised from its supporting member during the indexing movement by a hydraulic motor.

Another object of the present invention is to provide, a tool or work holder for a machine tool which includes a member indexible about an axis by a hydraulic motor positioned about the axis and wherein the member which is indexed is raised from its supporting member during indexing and clamped to its supporting member after indexing, preferably by hydraulic motors aligned with the hydraulic motor for effecting the indexing movement.

A further object of the present invent is to provide, in a machine tool, a new and improved tool or workholder including a rotatable tool or work-supporting portion in which the tool or work-supporting portion is lifted from its supporting member and indexed by hydraulic motors which are under the control of a single control valve, and is clamped against its supporting member upon completion of the indexing movement, the control valve and motors being preferably so constructed and arranged that when the control valve is moved in one direction from its neutral position, the holder is indexed in one direction, and when moved in the opposite direction, the holder is indexed in its other direction.

Another object of the present invention is to provide a tool or work holder attachment for a machine tool wherein the tool or work holding portion of the holder is rotatably supported with respect to a base member adapted to be mounted on a machine tool, and in which aligned hydraulic motors are provided for clamping the rotatable portion against the base member when a control valve is in its normal position and for lifting the rotatable portion with respect to its base member and indexing the rotatable portion upon movement of the control valve from its normal position to an indexing position, the holder preferably being indexed in the direction of movement of the control valve from its normal position.

Another object of the present invention is to provide an indexible holder for use in a machine tool which comprises an indexible member supported on a base member for indexible movement with respect thereto and in which the members are provided with a plurality of aligned bores each of which constitute a pressure chamber for a fluid pressure motor and wherein the fluid pressure supply to the motors is through a shaft extending between the bores, which shaft also interconnects the base member and the indexible member.

Further objects and advantages will be apparent from the following detailed description of embodiments of the present invention, made with reference to the accompanying drawings forming a part of the specification and in which:

Fig. 1 is a fragmentary elevational view of a lathe mounting a tool holder embodying the present invention;

Fig. 2 is a plan view of the tool holder mounted on the lathe shown in Fig. 1;

Figure 3:
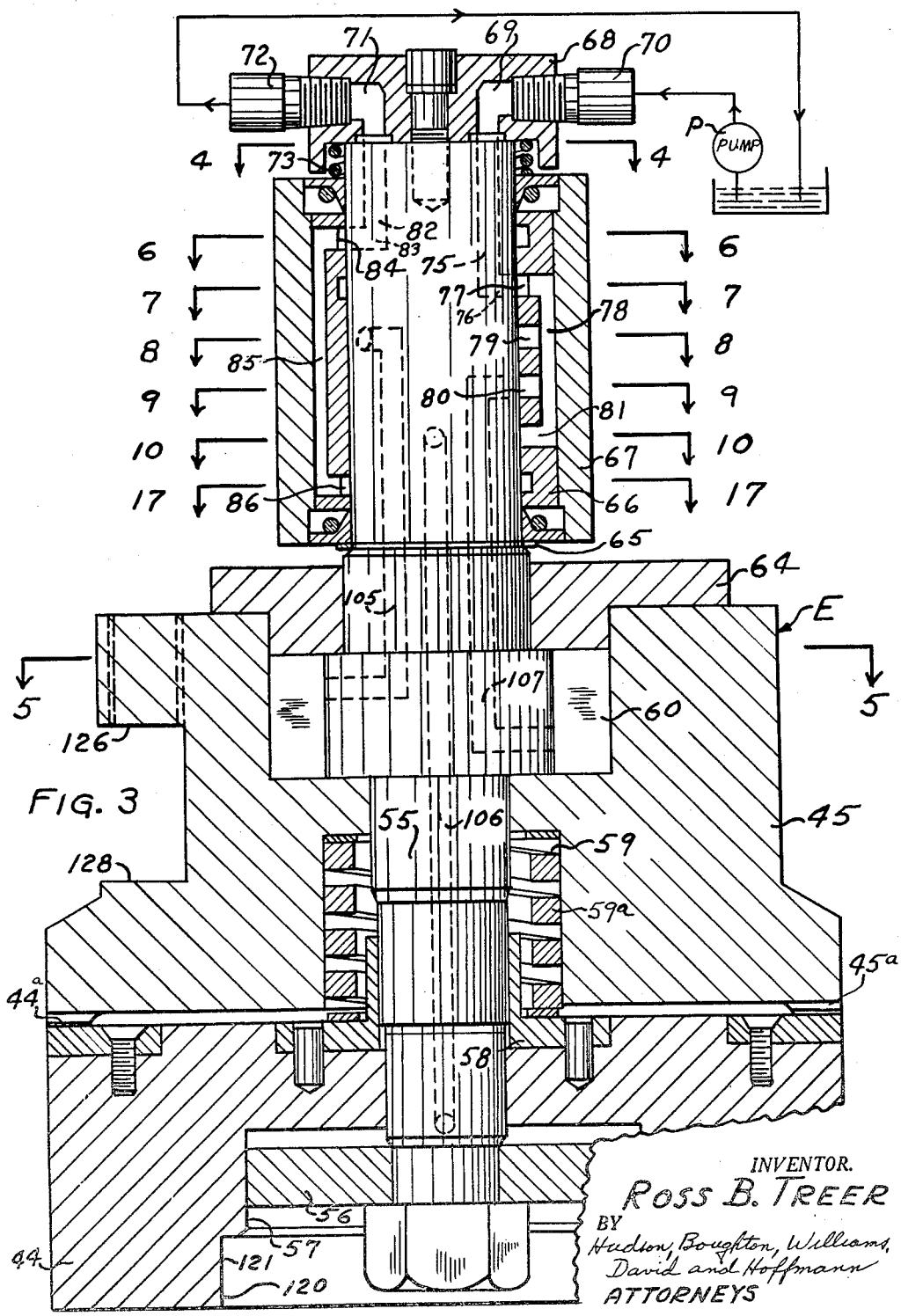
Fig. 3 is a vertical sectional view taken approximately along line 3—3 of Fig. 2.
Figure 6:
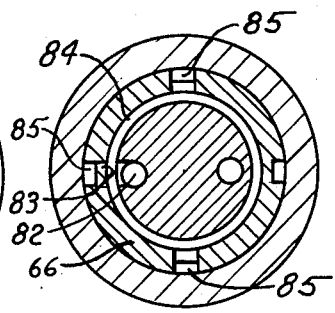
Figure 11:
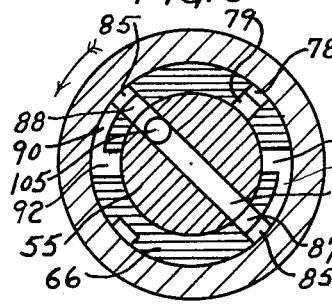
Figure 8:
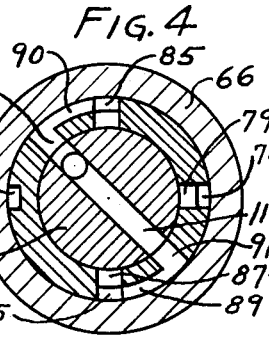
Figure 14:
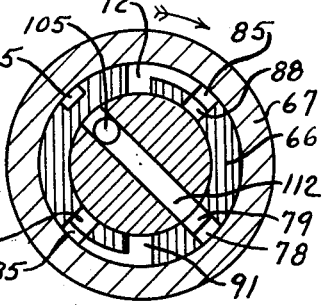
Figure 12:
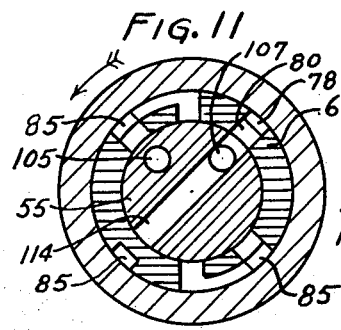
Figure 9:
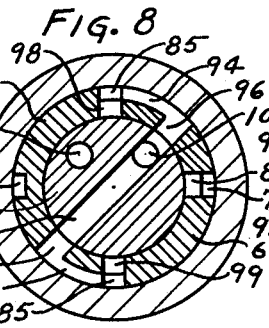
Figure 15:
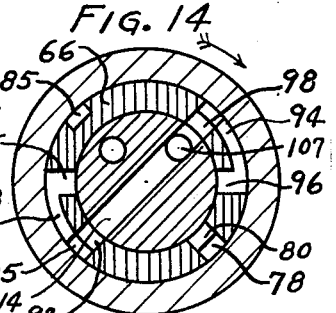
Figure 13:
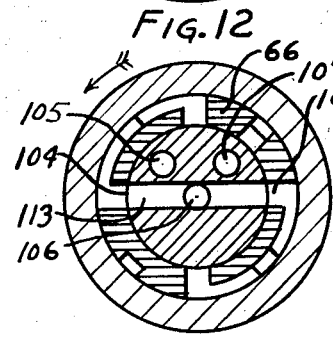
Figure 10:
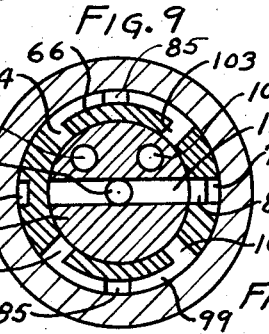
Figure 16:
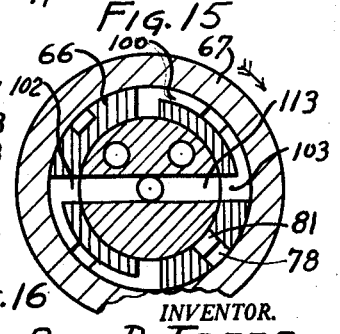
Figure 34:
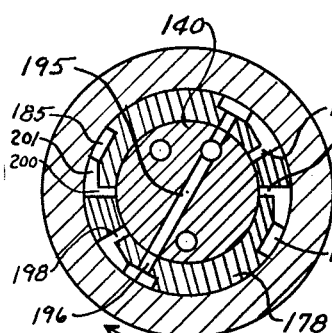

Figs. 6 and 7 are horizontal sectional views taken approximately along lines 6—6 and 7—7, respectively, of Fig. 3;

Figs. 8, 9 and 10 are horizontal sectional views through the control valve sleeve taken approximately along lines 8—8, 9—9 and 10—10, respectively, of Fig. 3 and showing the valve sleeve in its normal position;

Figs. 11, 12 and 13 are horizontal sectional views corresponding, respectively, to Figs. 8, 9 and 10, but showing the valve sleeve in position for causing the tool holder to index in one direction;

Figs. 14, 15 and 16 are horizontal sectional views corresponding to Figs. 8, 9 and 10, respectively, but showing the valve sleeve in its position for indexing the tool holder in its second direction;

Fig. 17 is a horizontal sectional view through the valve sleeve of the tool holder of Fig. 3 taken approximately along line 17—17 of Fig. 3;

Fig. 18 is a plan view of a tool holder embodying an alternate form of the present invention;

Fig. 19 is a vertical sectional view taken approximately along line 19—19 of Fig. 18;

Figs. 20, 21, 22, 23, 24 and 25 are horizontal sectional views through the valve sleeve of the tool holder shown in Fig. 19 taken approximately along lines 20—20, 21—21, 22—22, 23—23, 24—24 and 25—25, respectively and showing the valve sleeve in its central, non-indexing position;

Figs. 26 and 27 are horizontal sectional views through the indexing motor for the tool holder taken approximately along lines 26—26 and 27—27, respectively, of Fig. 19;

Fig. 28 is a horizontal sectional view taken approximately along line 28—28 of Fig. 19 showing the passages for connecting the hydraulic clamping motor to the control valve;

Fig. 29 is a horizontal sectional view taken approximately along line 29—29 of Fig. 19 showing the passage for connecting the hydraulic lifting motor to the control valve;

Figs. 30, 31, 32 and 33 are horizontal sectional views corresponding to Figs. 22, 23, 24 and 25, respectively;

Figs. 34, 35, 36 and 37 are horizontal sectional views corresponding to Figs. 30, 31, 32 and 33, respectively, but showing the valve sleeve rotated clockwise from its central position to an indexing position; and Figs. 38, 39, 40 and 41 are horizontal sectional views corresponding to Figs. 30, 31, 32 and 33, respectively, but showing the valve sleeve rotated counterclockwise to an indexing position from the central position shown in Figs. 30–33.

The present invention contemplates the provision of a new and improved indexible tool or work holder for use with machine tools. The present invention is particularly advantageous when embodied in an indexible tool holder constructed in the form of an attachment for a tool slide of a lathe.

Referring to the drawings, the present invention is illustrated as embodied in a lathe having a bed A, a headstock B and a cross slide carriage C supported for movement longitudinally of the bed A and having a cross slide D mounted thereon for movement transversely of the bed A. The construction and operation of the headstock B, the cross slide carriage C and the cross slide D are conventional and well understood by those skilled in the art and, therefore, will not be described or shown in detail. Suffice it to say, the headstock B is adapted to support and rotate the workpiece to be machined, and the cross slide carriage C is adapted to be fed longitudinally of the bed A by suitable power actuated means. The cross slide D may be moved transversely of the bed A on the carriage C by means of a handwheel 43.

According to the present invention, an indexible tool holder E, constructed in the form of an attachment, is mounted on the cross slide D and is adapted to support a plurality of tools T, two in the illustrated embodiment, for indexing movement to a position for machining a workpiece being rotated by the headstock B. The tool holder E comprises a base member 44 and an indexible tool holding member 45 supported upon the base member 44.

The base member 44 of the tool holder E mounts for limited endwise movement a vertically extending shaft 55. The lower end of the shaft 55, as viewed in Fig. 3, has secured to it a piston head 56 slidable in a cylindrical counterbore 57 and above the counterbore 57 the shaft 55 is splined to the base member 44 so that it does not rotate relative to the slide but has limited endwise movement relative thereto. The shaft 55 passes through a collar 58 rigidly connected to the upper side of the base member 44 and into a counterbore 59 formed in the indexible member 45 from whence it extends into a chamber 60 formed in the upper part of the tool holding member. The member 45 is connected to the shaft 55 so that it is rotatable with respect thereto but axially movable therewith.

Figure 5:
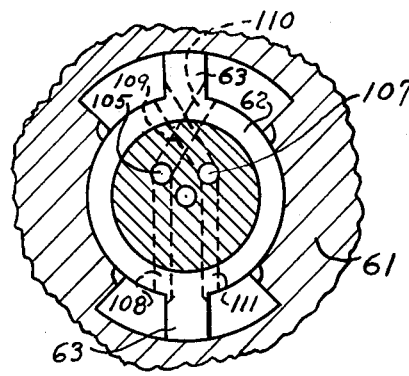
Fig. 5 is a horizontal sectional view taken approximately along line 5—5 of Fig. 3 and showing the hydraulic indexing motor of the holder.
Figure 4:
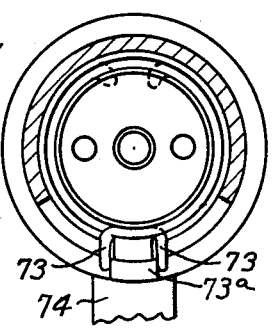
Fig. 4 is a horizontal sectional view taken approximately along line 4—4 of Fig. 3.

The chamber 60 in the tool holding member forms the cylinder of a pressure fluid motor and is provided at diametrically located points with vanes 61, the inner ends of which are arcuate and engage the circumference of a stator ring 62 secured to the shaft 55. The stator ring 62 at diametrically located positions is provided with radially extending stationary vanes 63, the outer ends of which are arcuate and interfit the wall of the chamber 60, see Fig. 5.

The chamber 60 is closed by a closure plate 64 secured to the upper side of the tool holding member 45 and provided with a central bore through which the shaft 55 extends. The shaft 55 above the closure plate 64 has fixed to it a collar 65 which supports a valve sleeve 66 rotatably fitting the shaft 55 and contained within a housing 67 which is rotatable with the sleeve as a unit.

A connecting plate 68 is fixedly secured to the upper end of the shaft 55 above the valve housing 67 and is provided with an inlet passage 69 to which the inlet conduit 70 of the pressure fluid circuit is connected and with an outlet or drain passage 71 to which the outlet or drain conduit 72 of the circuit is connected. It will be understood that the connecting plate 68 is fixed while the valve housing 67 and the valve sleeve 66 rotate as a unit on the shaft 55 and relative to said plate between the latter and the collar 65.

The underside of the tool holding member 45 and the upper side of the base member 44 have cooperating serrations 45a, 44a which are engaged or disengaged by slight endwise movement of the tool holding member 45 and shaft 55 to lock the tool holding member 45 in indexed position or to unlock the same for indexing rotation.

Opposed rat trap springs 73 are carried by the shaft 55 and the plate 68 and act on abutting portions 73a of the housing 67 to normally maintain said housing in a central or intermediate position. The valve housing 67 fixedly supports a valve operating lever 74 which can be moved from its normally central or intermediate position to one side or the other of such position to effect unlocking, indexing and locking of the tool holding member to bring either the roughing cutting tool or the finishing cutting tool into operative position.

Before describing the details of the control valve for the indexible tool holding member 45, it should be pointed out that the inlet conduit 70 connected to the connecting plate 68 extends to, and is connected to, the output side of a pump P. It should also be observed that the exhaust or drain conduit 72 connected to the connecting plate 68 extends to, and is connected with, the sump for the pump P.

As already stated, the inlet conduit 70 is connected to the inlet passage 69 in the connecting plate 68 while the outlet or drain conduit 72 is connected to the outlet passage 71 in said plate. The inlet passage 69 registers and communicates with a passage 75 formed in the upper end of the shaft 55 and extending downwardly a distance longitudinally thereof and having a laterally extended inner end constituting a port 76 communicating with an annular groove 77 in the inner circumference of the sleeve 66, see Figs. 3 and 7.

The annular groove 77 communicates with a vertically extending passage 78 formed in the valve sleeve 66 and valve housing 67. The vertically extending passage 78 communicates with vertically spaced ports 79, 80 and 81 formed at different planes in the valve sleeve 66 and extending to the inner circumference thereof, see Figs. 3, 8, 9 and 10.

The outlet or drain passage 71 in the connecting plate 68 registers and communicates with an outlet or drain passage 82 formed in the upper end of the shaft 55 and extending longitudinally and vertically downwardly of the shaft and having at its lower end a laterally offset port 83 communicating with an annular groove 84 formed in the inner circumference of the valve sleeve 66, see Figs. 3 and 6.

The annular groove 84 communicates with three circularly spaced vertically extending passages 85 formed in the valve housing 67 and valve sleeve 66 and spaced substantially 90° apart. One of the passages 85 is shown in Fig. 3, while all three of the passages 85 are shown in Figs. 6, 7, 8, 9, 10 and 17. The lower ends of the three passages 85 communicate with an annular groove 86 formed in the circumference of the valve sleeve 66, see Figs. 3 and 17. Should any of the pressure fluid in the valve leak or seep along the shaft 55 it will be collected in the annular grooves 84, 86 and carried to drain.

Referring to Fig. 8, it will be seen that in this plane the two vertical passages 85 which are diametrically opposed communicate with ports 87 and 88, respectively, which are formed in the valve sleeve 66 and which extend to the inner circumference thereof. It will also be seen that these two diametrically opposed vertically extending passages 85 communicate in the plane of Fig. 8 with arcuate passages 89 and 90, respectively, formed intermediate the valve sleeve 66 and the valve housing 67. The arcuate passage 89 communicates with a radial port 91 and the arcuate passage 90 communicates with a radial port 92, both of which ports are formed in the valve sleeve 66 and extend to the inner circumference thereof.

Referring to Fig. 9, it will be seen that in this plane through the valve the two diametrically opposed longitudinal passages 85 communicate, respectively, with arcuate passages 93 and 94 and that said arcuate passages at their ends communicate, respectively, with radial ports 95 and 96 formed in the valve sleeve 66 and extending to the inner circumference of the same.

Still referring to Fig. 9, it will further be seen that in this plane through the control valve the valve sleeve 66 is provided with radial ports 97 and 98 communicating, respectively, with the diametrically opposed longitudinal passages 85 and extending to the inner circumference of the valve sleeve.

Referring to Fig. 10, it will be seen that the two diametrically opposed longitudinal passages 85 also communicate, respectively, with arcuate passages 99 and 100 formed in the valve sleeve 66 and valve housing 67 with the longitudinal passages 85 being located midway between the ends of the arcuate passages 99 and 100.

The opposite ends of the arcuate passage 99 communicate, respectively, with radial ports 101 and 102 while the opposite ends of the arcuate passage 100 communicate, respectively, with radial ports 103 and 104, said radial ports 101, 102, 103 and 104 being formed in the valve sleeve 66 and extending to the inner circumference of the latter.

Referring to Fig. 17, it will be seen that the shaft 55 in this plane is provided with longitudinally extending passages 105, 106 and 107 (also see Fig. 3). The passage 105 extends downwardly in the shaft 55 into approximately the plane of the stator 62 where it communicates with a pair of divergent outwardly extending passages 108 and 110 communicating with the motor chamber in two of the four spaces between the stationary vanes 63 of the stator and the movable vanes 61 of the rotor which it will be recalled is the indexible tool holding member 45.

The passage 106 extends downwardly below the plane on which Fig. 17 is taken and centrally of the shaft 55 and communicates with the counterbore 57 between the piston 56 and the inner end or bottom of the counterbore. The passage 107 extends downwardly of the shaft 55 below the plane of Fig. 17 to approximately the location of the stator 62 where it communicates with a pair of divergent passages 109 and 111 communicating with the chamber of the pressure fluid motor and with the remaining two of the spaces between the stationary vanes 63 and the movable vanes 61.

The passage 105 extends longitudinally and vertically upwardly in the shaft 55 above the plane of Fig. 17 and reference to Fig. 8 will show that the upper end of said passage 105 communicates with a diametrically extending passage 112 formed in the shaft 55 and extending to the circumference thereof and in the central position of the valve indicated in Fig. 8 communicating with the ports 91 and 92 previously referred to.

The passage 106 in the shaft 55 extends upwardly above the plane of Fig. 17, and its upper end in the plane of Fig. 10 communicates with the diametrically extending passage 113 formed in the shaft 55 and extending to the circumference thereof. In the central position of the valve indicated in Fig. 10, one end of the passage 113 connects with the port 81 while the opposite end of the passage 113 is closed by the wall of the sleeve 66.

The passage 107 above the plane of Fig. 17 extends upwardly of the shaft 44 to the plane of Fig. 9 where it communicates with a diametrically extending passage 114 formed in the shaft 55 and having its opposite ends in the central position of the valve shown in Fig. 9 connected, respectively, to the ports 95 and 96 in the valve sleeve.

The control valve for the indexing of the tool holding member 45 has a central or intermediate position as indicated in Figs. 3, 6, 7, 8, 9 and 10 and a left-hand indexing position and a right-hand indexing position shown in Figs. 11, 12, 13 and 14, 15 and 16, respectively.

Referring to Figs. 8 and 11, it will be seen that when the valve housing 67 and valve sleeve 66 are rotated as a unit in a counterclockwise direction from the central position of Fig. 8 to the left-hand operative or indexing position of Fig. 11, the port 88 registers with the passage 112 in the shaft 55. Also at this time the port 87 in the valve sleeve registers with the passage 112 in the shaft.

Hence, the longitudinal passage 105 in the shaft 55 is at this time connected to drain. The ports 91 and 92 that communicate with the arcuate grooves 89 and 90 are closed by the circumference of the shaft 55. In the left-hand index position the port 79 in communication with the fluid pressure supply passage is blocked at its inner end by the shaft 55.

The counterclockwise movement of the valve housing and sleeve from central position to the left-hand indexing position has also caused the port 80 to move from the position shown in Fig. 9 to the position shown in Fig. 12 wherein it communicates with one end of the diametral passage 114 in the shaft 55 while the opposite end of said passage is closed by the valve sleeve 66. Since port 80 communicates with the longitudinal passage 78 that is connected to the pressure side of the preessure fluid system, fluid pressure is now connected to the longitudinal passage 107 in the shaft 55 and flows to the pressure fluid motor to impart counterclockwise indexing rotation to the tool holding member 45 until the movable vanes 61 abut the stationary vanes 63, it being recalled that passage 105 at this time is connected to drain, see Fig. 11.

Now referring to Fig. 10, it will be seen that the port 81 in the valve sleeve 66 registers with the diametral passage 113 in the shaft 55 when the valve sleeve is in its central position and this connects the pressure passage 78 to the passage 106 and hence the pressure fluid in the central position is acting on the piston head 56 to move the shaft 55 and the tool holding member 45 downwardly to interengage serrations 44a and 45a formed on the underside of the tool holding member and the upper side of the base member 44 to lock the tool holding member in the position to which it has previously been indexed and the pressure remains on the piston head until the valve housing has been rocked from its central position.

If the operator moves the control lever 74 toward the right to impart counterclockwise or left-hand rotation to the valve housing 67 and valve sleeve 66 to move the parts of the control valve in the plane of Fig. 13 from the position shown in Fig. 13 to the position shown in Fig. 10, then the port 81 moves out of communication with the passage 113 and is closed by the circumference of the shaft 55 thereby disconnecting the passage 106 from the pressure side of the circuit. This counterclockwise movement of the valve housing and valve sleeve connects the ports 101 and 104 with the diametral passage 113 in the shaft 55 and hence connects the passage 106 to drain, thus removing the pressure from the piston head 56, whereupon a spring 59a in the counterbore 59 in the tool holding member 45 functions to raise said tool holding member and shaft 55 to disengage the cooperating serrations 44a and 45a to unlock or release the tool holding member 45 for indexing movement which immediately occurs due to the connection of the passage 107 to the pressure side of the circuit and the passage 105 to the exhaust side as explained in connection with Figs. 11 and 12.

As soon as the tool holding member has been indexed in the counterclockwise direction to position one of the cutting tools carried thereby in operative position, the operator releases the control handle 74 and the rat trap springs 73 act on the valve housing and valve sleeve to rotate the same in a clockwise direction from the position shown in Figs. 11, 12 and 13 into the position shown in Figs. 8, 9 and 10, i.e., central position of the valve housing and valve sleeve.

This clockwise rotation of the valve housing and valve sleeve does not affect any rotative movement of the tool holding member 45 and as soon as the valve housing and valve sleeve are in the central position then the passage 106 is connected to the pressure side of the circuit as shown in Fig. 10 so that pressure fluid acts on the piston head 56 to move the tool holding member 45 and shaft 55 against the action of the spring 59a to interengage the serrations 44a, 45a and lock the tool holding member in its indexed position.

It will now be assumed that the tool holding member 45 is to be indexed from its counterclockwise or left-hand indexed position just described to its clockwise or right-hand indexed position, the operator moves the control lever 74 from its central position to its left-hand position to impart clockwise rotation to the valve housing 67 and sleeve 66. This clockwise rotation causes the ports and passages in the plane of Fig. 8 to change the relationship shown in Fig. 8 to that shown in Fig. 14. This clockwise rotation of the valve housing and sleeve moves the drain ports 91, 92 out of communication with the diametral passage 112 in the shaft 55, the ports 91, 92 now being closed by the circumference of the shaft 55. This movement also causes the pressure port 79 to move into communication with the passage 112 and thus connect the passage 112 and the longitudinal passage 105 to the pressure side of the circuit. At this time the drain ports 87, 88 are also closed by the circumference of the shaft 55. Since the longitudinal passage 105 extends to the motor, pressure fluid now flows to said motor between the stationary vanes 63 and the movable vanes 61 to rotate the tool holding member 45 carrying the movable vanes in a clockwise direction until the movable vanes contact the stationary vanes. The pressure fluid in the passage 105 is able to impart this clockwise rotation to the tool holding member 45 since the clockwise or right-hand rotation given the valve housing 67 and valve sleeve 66 has changed the relationship of the ports and passages in the plane of Fig. 8 from the position shown in said figure to the position shown in Fig. 14.

At the start of the clockwise movement referred to, the passage 107 was momentarily disconnected from drain but was again connected to drain at the completion of such movement to allow the indexing movement to commence.

Referring to Fig. 15, it will be seen that the drain port 98 now communicates with the diametral passage 114 with which the longitudinal passage 107 is in communication. The drain port 96 and the pressure port 80 are now closed by the circumference of the shaft 55. Also the drain ports 97, 98 now communicate with the passage 114 while the drain port 95 is closed by the circumference of the shaft.

Referring to Figs. 10 and 16, the clockwise rotation of the valve housing and valve sleeve first moves the pressure port 81 out of communication with the diametral passage 113 and hence the longitudinal passage 106 is disconnected from the pressure side of the circuit. The clockwise rotation of the valve housing and sleeve registers the drain ports 103 and 102 with the opposite ends of the diametral passage 113 so that the longitudinal passage 106 is connected to drain, whereupon the spring 59a acts upwardly on the tool holding member 45 to disengage the serrations 44a, 45a to allow the motor to impart the clockwise indexing rotation to the tool holding member.

When the indexing rotation has been completed, the operator releases the control lever 74 and the rat trap springs 73 act on the valve housing to rotate the latter and the valve sleeve in a counterclockwise direction to reestablish the relationship of the ports and passages from those shown in Figs. 14, 15 and 16 to those shown in Figs. 8, 9 and 10, at which time pressure fluid is on the passage 106 and the piston head 56 and moves said piston head downwardly to interengage the serrations 44a, 45a and lock the tool holding member in its presently indexed position.

The base member 44 of the tool holder E is formed so as to be readily attachable to, and detachable from, the machine tool with which it is to be used. In the illustrated embodiments, the tool holder E is designed for use on the cross slide of a lathe, and the base member 44 is provided with flanges 120, 121. The tool holder E may be clamped in position on the cross slide D by tightening bolts 124 and extending through the flanges to threadingly engage a conventional T-nut clamp member, not shown, positioned in T-slots 125 on the cross slide D.

In order to facilitate the attachment and detachment of the tool holder E to and from the machine tool, the fluid pressure supply and drain connections are preferably made through flexible hoses which may be connected to the connecting plate 68 by any suitable disconnect means.

In the embodiment described, the tools T are secured between parallel horizontally extending shoulders 126, 128 extending along two sides of the tool holding member 45, which sides extend at right angles to each other. The tools T are secured in position between the shoulders by bolts 129 which thread through openings in the upper shoulder 126. By referring to Fig. 2, it can be seen that by rotating the indexing member 45°, a first tool T, in position to engage the work, is moved away from the work and a second tool T moved into position to engage the work, and that when the second tool T is in position to engage the work, the first tool T can be moved back into work-engaging position by indexing the tool holding member 45 90° in the opposite direction.

The form of the tool holder shown in Figs. 3 and 18 comprises a hydraulic motor for indexing the tool holding member 45, a hydraulic motor for clamping the tool holding member 45 to the base member 44 and a spring motor for raising the tool holding member from the base member during the indexing movement. In the form of the invention illustrated in Figs. 19 and through 41, the tool holding member is lifted, indexed, and clamped by hydraulic motors carried by the tool holder E.

Referring to Fig. 19, the tool holder E shown therein comprises a base member 134 and a tool holding member 135 similar to the base member 44 and tool holding member 45, respectively, of the first-described embodiment. As in the first-described embodiment, the base member 134 has an axial counterbore 136 and a shaft 140 extends from the counterbore 136 through a collar 141 secured to the upper side of the base member and into a counterbore 142 opening into the lower side of the tool holding member 135. The shaft 140 is axially slidable with respect to the base member 134 but is keyed, or otherwise connected, thereto so as to prevent relative rotation therebetween.

The shaft 140 extends from the counterbore 142 through a bore 144 into a counterbore 146 which opens into the upper side of the tool holding member 135 but which is closed by a collar 147 through and above which the shaft 140 extends. The tool holding member 135 is rotatable with respect to the shaft 140 and has plates 148 recessed in the underside thereof along its opposite edges, which plates have formed thereon serrations 149 adapted to mesh with serrations 150 carried by plates 151 recessed in the upper side of the base member 134 for preventing relative rotation between the tool holding member 135 and the base member 134.

The tool holding member 135 is adapted to be clamped against the base member 134 by a hydraulic motor 152 comprising a piston 153 fixed to the shaft 140 adjacent to its lower end and operable in the counterbore 136. The counterbore 136 functions as the cylinder element of the motor 152. The motor 152 is connected to either the fluid pressure supply or drain by means of a port 154 in the shaft 140 opening into the counterbore 136 and communicating with an axially extending passage 155 in the shaft 140, the passage 155 extending from the lower end of the shaft to a point adjacent the upper portion thereof. The lower end of the passage 155 is plugged to prevent fluid flow therefrom.

When the tool holding member 135 is to be indexed, the member is moved away from the upper side of the base member 134 to disengage the serrations 149, 150 by a hydraulic motor 157 comprising a stationary element or piston 158 about the shaft 140 in counterbore 142 of the tool holding member 135, the piston 158 abutting against the upper end of the collar 141. The upper portion of the counterbore 142 forms the cylinder element of the hydraulic motor 157, and when fluid pressure is supplied thereto causes the indexible tool holding member 135 to move upwardly with respect to the base member 134 carrying with it the shaft 140. Fluid pressure is supplied to the hydraulic motor 157 through a radial port 160 in the shaft 140, the port 160 communicating with the counterbore 142 and with an axially extending passage 161 in the shaft 140. The passage 161 extends parallel to the axis of the shaft from the port 160 to the upper end of the shaft, the upper end of the passage being blocked to prevent fluid flow therefrom.

The tool holding member 135 is indexed between its positions by a vane-type hydraulic motor 163 which is similar to the indexing motor of the first-described embodiment and comprises a pressure chamber element formed by the counterbore 146, the counterbore having elements or vanes 164, 165 which are integral with the indexible member 135 and constitute movable vanes and are adapted to cooperate with stationary elements or vanes 166, 167 formed on the shaft 140. The movable vanes 164, 165 are diametrically opposed to each other and are located on opposite sides of the shaft 140, and the stationary vanes 166, 167 extend outwardly from the shaft 140 at diametrically opposite points on the shaft. Fluid pressure is supplied to the motor 163 through either one of two axially extending passages 170, 171 in the shaft 140. The passage 170 communicates with the space between the stationary vane 167 and the movable vane 164 and with the space between the stationary vane 166 and the movable vane 165 through a passage 172 lying in a plane extending transversely of the shaft 140. When fluid pressure is supplied through the passage 170 to the spaces mentioned, the tool holding member 135 moves in a clockwise direction until the movable vanes 164, 165 are in engagement with the stationary vanes 166, 167, respectively.

The axially extending passage 171 communicates with the space between the stationary vane 167 and the movable vane 165 and with the space between the stationary vane 166 and the movable vane 164 through a passage 173. When fluid pressure is supplied to the hydraulic motor 163 through the axially extending passage 170 and the communicating passage 173, the tool holding member 135 moves in a counterclockwise direction until the movable vanes 164, 165 engage, respectively, stationary vanes 167, 166.

The axially extending passages 155, 161, 170 and 171 in the shaft 140 are either connected to the supply of pressure fluid or to drain by means of a control valve 175 supported about the upper portion of the shaft 140 which is above the collar 147 by a support ring 176 fixed to the shaft 140. The control valve 175 comprises an annular valve housing 177 and a valve sleeve 178 intermediate the housing 177 and the shaft 140, the valve sleeve 178 and the housing 177 being rotatable as a unit on the shaft 140. The control valve 175 is biased to a central position from which it is movable in either direction to cause the tool holding member 135 to index. The valve is biased to its central position by springs 179 which are similar and operate in a manner similar to the springs 73 of the first-described embodiment.

The pressure supply and drain connections to the control valve 175 are made through a connecting plate 180 fixed to the upper end of the shaft 140. The connecting plate 180 has a pressure supply passage 181 formed therein which is adapted to be connected by suitable connections to the discharge side of the fluid pressure pump and which communicates with an axially extending passage 182 in the shaft 140. The axially extending passage 182 in the shaft 140 communicates with an annular groove 183 in the internal circumference of the valve sleeve 178 through a port 184, see Fig. 21. The annular groove is, in turn, connected with a pair of axially extending passages 185 formed in the outer circumference of the valve sleeve, the passages 185 being diametrically opposed to each other and terminating short of the ends of the valve sleeve.

The connecting plate 180 is also formed with a drain passage 187 adapted to be connected to the sump by suitable means readily detachable from the connecting plate, the passage communicating with an axially extending passage 188 in the shaft 140. Passage 188 communicates at its lower end with an annular drain groove 190 in the internal circumference of the upper portion of the valve sleeve 178 through a port 191, the annular groove 190 being positioned in a plane above the pressure groove 183, see Fig. 20.

As is best shown in Fig. 20, the drain groove 190 is connected to diametrically opposed axially extending passages 192 in the outer circumference of the valve sleeve 178 by ports 193, the passages 192 being spaced 90° from the pressure passages 185. The passages 192, at their lower ends, are in communication with an annular groove 194 in the internal circumference of the valve sleeve by means of ports 194a, see Fig. 19.

The vertical passage 171 in the shaft 140 for supplying fluid pressure to index the tool holding member 45 in a counter-clockwise direction is normally connected to the drain passages 192 in the valve sleeve through a diametral passage 195 in the shaft 140, the passage 195 lying in the horizontal plane of Fig. 22. The opposite ends of the diametral passage 195 are connected to the drain passages 192, when the valve sleeve is in its normal or central position shown in Fig. 22, by diametrically opposed ports 196 in the valve sleeve 178, which ports 196 are connected to the drain passages 192 by interconnecting passages 197 formed in the outer periphery of the valve sleeve. The diametral passage 195 is also connected to the drain passages 192 when the valve sleeve is rotated in a clockwise direction from its central position by diametrically opposed ports 198, respectively, spaced counterclockwise from the corresponding ports 196 and extending, respectively, from the drain passages 192 to the internal circumference of the valve sleeve 178. Thus, it may now be seen that the diametral passage 195 and the vertical passage 171 are connected to drain when the valve sleeve 178 is in its central position or is rotated clockwise to its clockwise indexing position, shown in Fig. 34.

Figure 30:
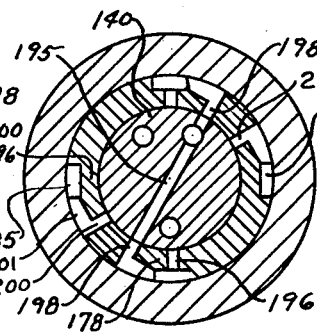
Figure 38:
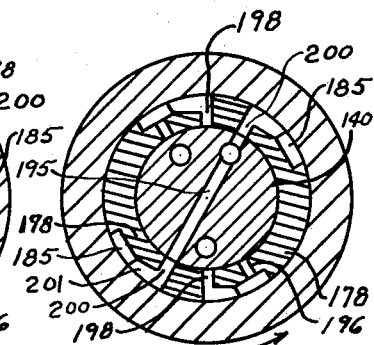

If the valve sleeve is rotated counterclockwise from its central position, the vertical passage 171 and the diametral passage 195 are connected to the pressure passages 185 by diametrically opposed ports 200 in the valve sleeve 178 which are, respectively, spaced counterclockwise from the corresponding pressure passages 185, and which open into the central opening of the valve sleeve. The ports 200, respectively, communicate with the pressure passages 185 through interconnecting passages 201 in the outer periphery of the valve sleeve, as shown in Fig. 30. When the ports 200 register with the opposite ends of the diametral passage 195, the drain ports 198, 196 are blocked at their inner end by the circumference of the shaft 140. Thus, it can now be seen that when the valve sleeve 178 is moved in a counterclockwise direction to its counterclockwise indexing position, pressure fluid is supplied to the vertically extending passage 171 to cause the indexing motor 163 to index the tool holding member 135 in a counterclockwise direction.

Figure 31:
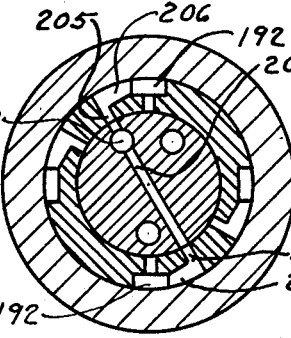
Figure 39:
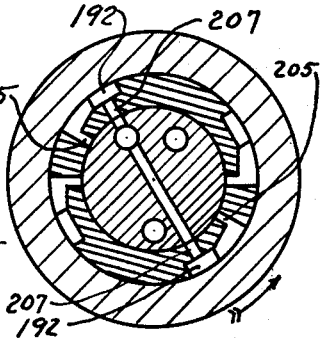

The vertical passage 170 for the fluid pressure motor 163 is connected to drain through a diametral passage 204 in the shaft 140 at the plane of Fig. 31 when the control valve 175 is in its central position and when it is moved in a counterclockwise direction to its counterclockwise indexing position. When the control valve 175 is in its central position, the opposite ends of the diametral passage 204 register with diametrically opposed drain ports 205 in the valve sleeve 178, which ports are, respectively, spaced counterclockwise from the corresponding drain passages 192 and are, respectively, connected to the corresponding passage 192 through respective interconnecting passages 206 formed in the outer circumference of the valve sleeve. When the control valve is moved counterclockwise to its counterclockwise indexing position, the opposite ends of the diametral passage 204 register, respectively, with opposed drain ports 207 which extend radially from the drain passages 192 to the inner circumference of the valve sleeve 178, see Fig. 39.

Figure 35:
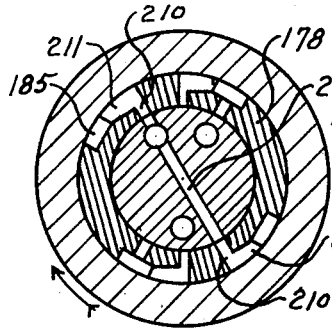

As is best shown in Fig. 35, when the control valve is moved clockwise to its clockwise indexing position, the vertical passage 163 and the diametral passage 204 are connected to the pressure passages 185 by diametrically opposed ports 210 in the valve sleeve 178 which register, respectively, with the opposite ends of the diametral passage 204. The pressure ports 210 are, respectively, spaced clockwise from the corresponding passages 185 to which they are connected by respective interconnecting passages 211 formed in the outer circumference of the valve sleeve. When the pressure ports 210 are in registry with the diametral passage 204, the inner ends of the drain ports 205, 207 are blocked by the outer circumference of the shaft 140.

It may now be seen that when the control valve is moved clockwise to its clockwise indexing position, the vertical passage 170 is connected to the pressure passages 185 in the valve sleeve 178, and the vertical passage 171 is connected to the drain passages in the valve sleeve, thereby causing the indexing motor 163 to move the tool holding member in a clockwise direction. When the control valve is moved counterclockwise to its counterclockwise indexing position, the connections are reversed and the tool holding member is indexed in a counterclockwise direction.

Figure 32:
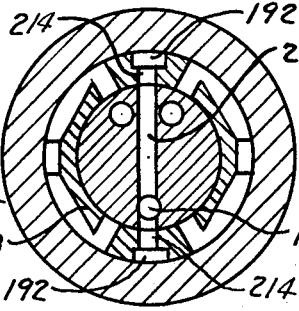

The hydraulic motor 157 for lifting the tool holding member 135 from the base member 44 to disengage the serrations 149, 150 is normally connected to the drain passages 192 by a diametral passage 213 in the shaft 140 in the plane of Fig. 32 which diametral passage communicates with the vertical passage 161. When the control valve 175 is in its central position, the opposite ends of the diametral passage 213 register, respectively, with diametrically opposed ports 214 extending radially inwardly from the drain passages 192, respectively, to the inner circumference of the valve sleeve 178.

Figure 40:
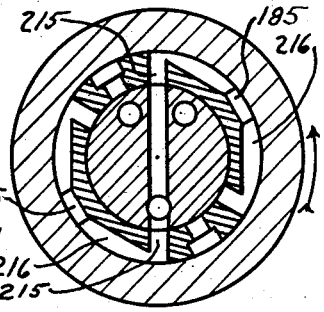
Figure 37:
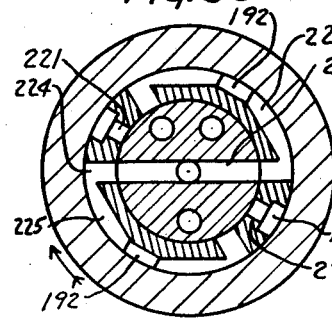

When the control valve 175 is moved counterclockwise to its counterclockwise indexing position, as shown in Fig. 40, the opposite ends of the diametral passage 213 register, respectively, with diametrically opposed ports 215 which are connected, respectively, to the pressure passages 185 by respective interconnecting passages 216 formed in the outer periphery of the valve sleeve 178, the ports 215 being spaced in a counterclockwise direction from the corresponding passages 185.

Figure 36:
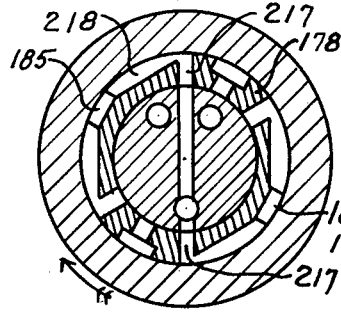

When the control valve is moved clockwise to its clockwise indexing position, the opposite ends of the diametral passage 213 register, respectively, with diametrically opposed ports 217 in the valve sleeve 178 which are, respectively, connected to the pressure passages 185 by respective interconnecting passages 218 formed in the outer periphery of the valve sleeve 178, as is best shown in Fig. 36.

Figure 33:
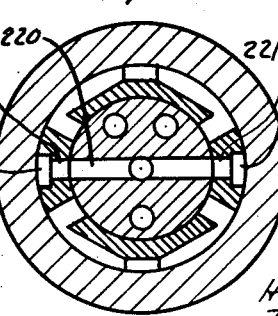
Figure 41:
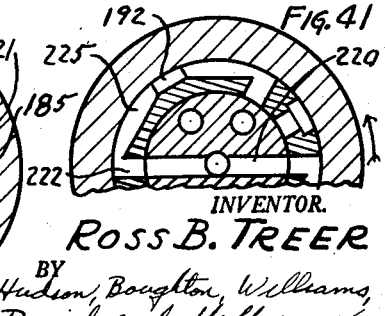

When the control valve 175 is in its central position, pressure fluid is supplied through the vertical passage 155 in the shaft to the hydraulic motor 152 to apply a clamping pressure which engages the serrations 149, 150 to prevent rotation of the tool holding member 135 with respect to the base member 134. As is best shown in Fig. 33, when the control valve is in its central position the vertical passage 155 is connected to the pressure passages 185 of the valve sleeve 178 through a diametral passage 220 in the shaft 140, the diametral passage 220 being located in the plane of Fig. 33. Pressure fluid is supplied from the pressure passages 185 to the diametral passage 220 through diametrically opposed ports 221 extending radially from the passages 185 to the inner circumference of the valve sleeve 178 and registering with the opposite ends of the diametral passage 220 when the control valve is in its central position.

When the control valve 175 is moved counterclockwise or clockwise to either of its indexing positions, the diametral passage 220 is connected to the drain passages 192 of the valve sleeve. If the control valve is moved counterclockwise, the opposite ends of the diametral passage 220 register with diametrically opposed ports 222 in the valve sleeve 178, the ports 222 being connected to the drain passages 192 by interconnecting passages 223 formed in the outer circumference of the valve sleeve, see Fig. 41. If the control valve 175 is moved clockwise to its clockwise indexing position, the opposite ends of the diametral passage 220 register, respectively, with drain ports 224 in the valve sleeve 178, the ports 224 being connected, respectively, to the drain passages 192 by interconnecting passages 225 formed in the circumference of the valve sleeve. When the control valve is moved in either direction to connect the diametral passage 220 to the drain passages 192, the inner ends of the pressure ports 221 are blocked by the circumference of shaft 140.

From the foregoing description, it may now be seen that as long as the valve sleeve 178 is in its central position it functions to continuously supply fluid pressure fluid to the hydraulic motor 152 and to connect the motors 157, 163 to drain. When the control valve 175 is moved to either of its indexing positions, the hydraulic motor 157, which is connected to drain when the control valve is in its central position, has fluid pressure supplied thereto through the vertical passage 161 to cause the tool holding member 45 to move away from the base member 44 and, simultaneously with the supply of pressure fluid to the motor 157, pressure fluid is supplied to one side of the motor 163 through one of the passages 170, 171, the particular passage supplied depending on the direction of movement of the valve, while the other of the passages is connected to drain to index the tool holding member 135 in the selected direction.

As in the first-described embodiment, suitable clamping means, not shown, is carried by the base member to securely fasten the base member in position in the T-slots of the cross slide. The clamping means may be the same as that in the first-described embodiment.

It can now be seen that the present invention provides a new and improved indexible tool holder for use in machine tools and the objects heretofore enumerated and others have been accomplished. A tool holder embodying the preferred embodiment of the present invention is readily attachable to, and detachable from, a machine tool and comprises power actuated or motor means for indexing the indexible member on the base member which supports the indexible member and for clamping the indexible member against the base member and for moving the indexible member away from the base member during its indexing movement. The motor for indexing the indexible member of the tool holder and at least one of the motors for lifting and clamping the indexible motor from and to the base member are preferably fluid pressure motors, and the motor for performing the mentioned operations are preferably coaxial with the axis of rotation of the indexible member and are preferably controlled by a single control valve also coaxial with the axis of rotation, which valve is movable from a central position in either a clockwise or counterclockwise direction to cause the tool holder to index, respectively, in a clockwise or counterclockwise direction.

While embodiments of the present invention have been described in considerable detail, it is hereby my intention to cover all modifications, constructions and arrangements which fall within the practice of those skilled in the art and the spirit and scope of the appended claims.

Having thus described my invention, I claim:

1. An indexible holder for a machine tool comprising a base member, an indexible member mounted on said base member for rotary indexible movement, a shaft extending through said indexible member and into said base member, a fluid pressure motor for rotating said indexible member with respect to said base and comprising a pressure chamber formed in one of said members about said shaft and an element fixed to said shaft, a fluid pressure motor for clamping said indexible member against said base member to prevent rotation thereof, the last said motor having a pressure chamber formed in one of said members about said shaft and said shaft having axially extending passages therein communicating with said motors for supplying pressure fluid thereto, motor means operatively connected between said members for moving said indexible member away from said base member to permit indexing movement with respect thereto and valve means positioned coaxially about said shaft for simultaneously controlling the pressure fluid connections to said motors.

2. A holder as in claim 13 wherein said motor means is a third fluid pressure motor and said shaft has an axially extending passage for supplying pressure fluid to said third motor and said valve means controls the supply of pressure fluid to the last said passage.

3. An indexible holder for a machine tool comprising a base member, an indexible member mounted on said base member for rotary indexible movement about an axis, a shaft coaxial with said axis and axially movable in said base member and extending from said base member through said indexible member, said indexible member being rotatable with respect to said shaft and axially movable therewith, a fluid pressure motor including a pressure chamber formed in said indexible member about said shaft for rotating said indexible member with respect to said base member, motor means for lifting said indexible member from said base member, motor means for clamping said indexible member against said base member to prevent rotation thereof, one of said motor means being a fluid pressure motor and having a pressure chamber formed in one of said members about said shaft, said shaft having passages therein communicating with said hydraulic motors for supplying pressure fluid thereto, and valve means positioned coaxially about said shaft for simultaneously controlling the fluid pressure connections to said motors.

4. An indexible holder for a machine tool comprising a base member, an indexible member mounted on said base member for rotary indexible movement with respect thereto, said members having three aligned chambers formed therein, a shaft supported by said members and extending between said chambers and outwardly of said indexible member, a fluid pressure vane-type motor for indexing said indexible member, a fluid pressure motor for applying a clamping pressure to said indexible member tending to move the latter toward said base member, a third fluid pressure motor for moving said indexible member axially in a direction away from said base member, said fluid pressure motors each having a pressure chamber formed by a different one of said aligned chambers and said fluid pressure vane-type motor including an element fixed to said shaft, a control valve coaxially positioned about said shaft outwardly of said indexible member, said shaft having longitudinally extending passages therein interconnecting said valve and said motors, which passages are selectively connectable to a source of pressure fluid or to drain through said valve to control the operation of said motors.

5. A holder as defined in claim 4 wherein said base member and said indexible members have serrations on their adjacent sides which are engaged when fluid pressure is supplied to said second motor and said third motor is connected to drain and which are disengaged when fluid pressure is supplied to said third motor and said second motor is connected to drain.

6. An indexible holder for a machine tool comprising a base member, an indexible member mounted on said base member for rotary indexible movement, said indexible member having counterbores coaxial with the axis of rotation of said indexible member and opening into opposite sides thereof, said base member having a counterbore coaxial with said indexible member, a shaft extending between said counterbores and outwardly of said indexible member, means non-rotatably connecting said shaft to said base member but permitting relative axial movement therebetween said indexible member being rotatable with respect to said shaft and axially movable therewith, a fluid pressure motor having a pressure chamber formed by one of said counterbores in said indexible member and including movable vanes extending inwardly from said one counterbore and stationary vanes fixed to said shaft for indexing said indexible member, a fluid pressure actuator having a cylinder element formed by the other of said counterbores in said indexible member for moving said shaft and said indexible member in an axial direction away from said base member, a fluid pressure actuator for moving said indexible member toward said base member and applying a clamping pressure therebetween comprising a cylinder element formed by said counterbore in said base member and a piston element fixed to said shaft, and valve means positioned coaxially about said shaft for controlling the pressure and drain connections to said motor and said actuators and movable in one direction to cause indexing of said member in one direction and in the other direction to cause indexing of said member in the opposite direction, said shaft having longitudinal passages therein communicating respectively with said counterbores and said valve means.

7. An indexible holder for a machine tool comprising a base member, an indexible member mounted on said base member for rotary indexible movement, said indexible member having upper and lower counterbores aligned with the axis of rotation of said indexible member and opening into the upper and lower side thereof respectively, means for closing said upper counterbore, said base member having a counterbore coaxial with the counterbores of said indexible member, a shaft extending between said counterbores and outwardly of said indexible member, means non-rotatably connecting said shaft to said base member but permitting relative axial movement therebetween said indexible member being rotatable with respect to said shaft and axially movable therewith, a fluid pressure motor for indexing said indexible member having a pressure chamber formed by said upper counterbore in said indexible member and including movable vanes fixed to said indexible member and extending inwardly from the wall of said upper counterbore and stationary vanes fixed to said shaft, a spring positioned in said lower counterbore and urging said members apart, a fluid pressure actuator for moving said indexible member toward said base member against the force of said spring to apply a clamping pressure between said members, said actuator comprising a cylinder element formed by said counterbore in said base member and a piston element fixed to said shaft, and valve means positioned coaxially about said shaft for controlling the pressures and drain connections to motor and said actuator and movable in one direction to cause indexing of said member in one direction and in the other direction to cause indexing of said member in the opposite direction, said shaft having longitudinal passages therein communicating respectively with said counterbores and said valve means.

8. An indexible holder for a machine tool comprising a base member, an indexible member mounted on said base member for rotary indexible movement, a shaft extending through one of said members and into the other of said members, a vane type fluid motor for rotating said indexible member and comprising a pressure chamber formed in one of said members about said shaft and a piston element, means connecting said piston element to said shaft and holding the piston element against rotation relative to the shaft, a second fluid pressure motor for clamping said indexible member against said base member to prevent rotation of the indexible member, said second fluid pressure motor comprising a pressure chamber formed in one of said members and about said shaft and a piston element, means connecting said piston element of said second motor to said shaft and holding the element against axial movement relative to said shaft, said shaft having a plurality of passages communicating with said chambers for supplying fluid pressure thereto, and means supporting said shaft for rotation relative to the member in which the pressure chamber of the vane type motor is formed and further supporting said shaft for axial movement relative to the member in which the pressure chamber of said second motor is formed and against axial movement with respect to the other member.

9. An indexible holder as defined in claim 8 wherein a third fluid pressure motor comprising a pressure chamber formed about said shaft and a piston element is provided for lifting said indexible member from said base member, and means connecting said piston element of said third fluid pressure motor to said shaft and holding the piston element and said shaft against relative axial movement, said shaft having a passage communicating with the chamber of said third fluid pressure motor.

References Cited in the file of this patent
UNITED STATES PATENTS

| | | |
|---|---|---|
| 728,457 | Hanson | May 19, 1903 |
| 1,924,594 | Blood et al. | Aug. 29, 1933 |
| 2,309,998 | Tucker | Feb. 2, 1943 |
| 2,392,964 | Armitage et al. | Jan. 15, 1946 |
| 2,461,631 | Darash | Feb. 15, 1949 |
| 2,615,288 | Klay et al. | Oct. 28, 1952 |
| 2,621,396 | Gracchi | Dec. 16, 1952 |
| 2,645,981 | Hirvonen | July 21, 1953 |
| 2,796,776 | Locke et al. | June 25, 1957 |
| 2,842,986 | Rodal | July 15, 1958 |

FOREIGN PATENTS

| | | |
|---|---|---|
| 498,920 | Great Britain | Jan. 11, 1939 |

UNITED STATES PATENT OFFICE
CERTIFICATE OF CORRECTION

Patent No. 2,915,922 December 8, 1959

Ross B. Treer

It is hereby certified that error appears in the printed specification of the above numbered patent requiring correction and that the said Letters Patent should read as corrected below.

Column 13, line 23, for the claim reference numeral "13" read -- 1 --.

Signed and sealed this 14th day of June 1960.

(SEAL)
Attest:

KARL H. AXLINE
Attesting Officer

ROBERT C. WATSON
Commissioner of Patents